United States Patent
Doyle et al.

(10) Patent No.: US 9,758,410 B2
(45) Date of Patent: Sep. 12, 2017

(54) USING CONTINUOUS NITRATE MEASUREMENT TO CONTROL AERATION IN AN AERATED-ANOXIC PROCESS

(71) Applicant: Evoqua Water Technologies LLC, Alpharetta, GA (US)

(72) Inventors: Michael L. Doyle, Wauwatosa, WI (US); Michael Casey Whittier, Waukesha, WI (US)

(73) Assignee: Evoqua Water Technologies LLC, Warrendale, PA (US)

( * ) Notice: Subject to any disclaimer, the term of this patent is extended or adjusted under 35 U.S.C. 154(b) by 429 days.

(21) Appl. No.: 14/357,595

(22) PCT Filed: Nov. 16, 2012

(86) PCT No.: PCT/US2012/065524
§ 371 (c)(1),
(2) Date: May 12, 2014

(87) PCT Pub. No.: WO2013/074929
PCT Pub. Date: May 23, 2013

(65) Prior Publication Data
US 2014/0319055 A1    Oct. 30, 2014

Related U.S. Application Data

(60) Provisional application No. 61/560,318, filed on Nov. 16, 2011.

(51) Int. Cl.
*C02F 3/00* (2006.01)
*C02F 3/30* (2006.01)
(Continued)

(52) U.S. Cl.
CPC .............. *C02F 3/30* (2013.01); *C02F 3/006* (2013.01); *C02F 3/305* (2013.01); *C02F 3/085* (2013.01);
(Continued)

(58) Field of Classification Search
CPC .. C02F 3/006; C02F 2209/14; C02F 2209/15; C02F 3/302; C02F 3/305;
(Continued)

(56) References Cited

U.S. PATENT DOCUMENTS

| 5,589,068 A | * | 12/1996 | Nielsen | ................... C02F 3/006 210/614 |
|---|---|---|---|---|
| 5,989,428 A | | 11/1999 | Goronszy | |

(Continued)

OTHER PUBLICATIONS

European Search Report, EP Application No. 12850729.0, dated Jul. 1, 2015.

*Primary Examiner* — Claire Norris (57) ABSTRACT

A method and system for treating wastewater is disclosed. In one embodiment the method includes introducing the wastewater into an aerated anoxic treatment unit, flowing an oxygen containing gas into the wastewater in the aerated anoxic treatment unit at a first flow rate, measuring a concentration of a nitrogen species in the wastewater in the aerated anoxic treatment unit, comparing the measured concentration of the nitrogen species to a target nitrogen species concentration, adjusting the flow of the oxygen containing gas into the wastewater in the aerated anoxic treatment unit to a second flow rate in response to a difference in the nitrogen species and the target nitrogen species concentrations, and maintaining the second flow rate for a time period sufficient for the wastewater to be treated in the aerated anoxic treatment unit and form an anoxically treated liquid having a reduced concentration of the nitrogen species.

12 Claims, 7 Drawing Sheets

(51) Int. Cl.
*C02F 3/08* (2006.01)
*C02F 3/12* (2006.01)

(52) U.S. Cl.
CPC ............ *C02F 3/1268* (2013.01); *C02F 3/308* (2013.01); *C02F 2209/003* (2013.01); *C02F 2209/005* (2013.01); *C02F 2209/14* (2013.01); *C02F 2209/15* (2013.01); *C02F 2209/22* (2013.01); *C02F 2209/38* (2013.01); *C02F 2305/06* (2013.01); *Y02W 10/15* (2015.05)

(58) Field of Classification Search
CPC .......... C02F 2209/001; C02F 2209/003; C02F 2209/16; C02F 2209/38; Y10S 210/903
USPC ................................. 210/614, 903, 143, 739
See application file for complete search history.

(56) References Cited

U.S. PATENT DOCUMENTS

| | | | |
|---|---|---|---|
| 6,254,778 B1 * | 7/2001 | Chudoba | C02F 3/006 |
| | | | 210/197 |
| 2011/0284461 A1 * | 11/2011 | DiMassimo | C02F 3/006 |
| | | | 210/616 |

* cited by examiner

USING CONTINUOUS NITRATE MEASUREMENT TO CONTROL AERATION IN AN AERATED-ANOXIC PROCESS

FIELD OF TECHNOLOGY

Aspects and embodiments of the present disclosure are directed generally to systems and methods for the treatment of wastewater. In some embodiments, the wastewater treatment includes control of aeration of an aerated anoxic treatment unit responsive to the measurement of a nitrogen species in wastewater in the aerated anoxic treatment unit to provide a desired level of a nitrogen species in treated water output from the system.

SUMMARY

In accordance with an aspect of the present disclosure there is provided a method of treating wastewater. The method comprises introducing the wastewater into an aerated anoxic treatment unit, flowing an oxygen containing gas into the wastewater in the aerated anoxic treatment unit at a first flow rate, measuring a concentration of a nitrogen species in the wastewater in the aerated anoxic treatment unit, comparing the measured concentration of the nitrogen species to a target nitrogen species concentration, adjusting the flow of the oxygen containing gas into the wastewater in the aerated anoxic treatment unit to a second flow rate in response to a difference in the nitrogen species and the target nitrogen species concentrations, and maintaining the second flow rate for a time period sufficient for the wastewater to be treated in the aerated anoxic treatment unit and form an anoxic ally treated liquid having a reduced concentration of the nitrogen species.

In accordance with some embodiments measuring the concentration of the nitrogen species in the wastewater in the aerated anoxic treatment unit comprises measuring a concentration of nitrate in the wastewater in the aerated anoxic treatment unit.

In accordance with some embodiments adjusting the flow of the oxygen containing gas to the second flow rate comprises decreasing the flow of the oxygen containing gas from the first flow rate to the second flow rate responsive to the concentration of nitrate in the wastewater in the aerated anoxic treatment unit exceeding the target nitrogen species concentration.

In accordance with some embodiments adjusting the flow of the oxygen containing gas comprises adjusting the flow of the oxygen containing gas responsive to the concentration of nitrate in the wastewater in the aerated anoxic treatment unit exceeding about one milligram per liter.

In accordance with some embodiments measuring the concentration of the nitrogen species in the wastewater in the aerated anoxic treatment unit comprises measuring a concentration of ammonia in the wastewater in the aerated anoxic treatment unit.

In accordance with some embodiments adjusting the flow of the oxygen containing gas to the second flow rate comprises increasing the flow of the oxygen containing gas from the first flow rate to the second flow rate responsive to the concentration of ammonia in the wastewater in the aerated anoxic treatment unit exceeding the target nitrogen species concentration.

In accordance with some embodiments adjusting the flow of the oxygen containing gas comprises adjusting the flow of the oxygen containing gas responsive to the concentration of ammonia in the wastewater in the aerated anoxic treatment unit exceeding about five milligrams per liter.

In accordance with some embodiments the method further comprises introducing the anoxically treated liquid into a second biological treatment unit, providing conditions for the anoxically treated liquid to be treated in the second biological treatment unit to form an effluent, measuring a concentration of a nitrogen species in the effluent, determining a correlation between the measured concentration of the nitrogen species in the effluent and the measured concentration of the nitrogen species in the wastewater in the aerated anoxic treatment unit, and setting the target nitrogen species concentration based on the determined correlation to achieve a concentration of the nitrogen species in the effluent below an effluent nitrogen species target concentration.

In accordance with some embodiments measuring the concentration of the nitrogen species in the effluent comprises measuring a concentration of ammonia in the effluent.

In accordance with some embodiments setting the target nitrogen species concentration comprises setting the target nitrogen species concentration to achieve an ammonia concentration in the effluent below about one milligram per liter.

In accordance with another aspect of the present disclosure there is provided a wastewater treatment system. The wastewater treatment system comprises an aerated biological treatment unit, a nitrogen species concentration sensor included in the aerated biological treatment unit and configured to output a signal indicative of a concentration of a nitrogen species in wastewater present in the aerated biological treatment unit, and a control system configured to adjust a flow of an oxygen containing aeration gas into the wastewater in the aerated biological treatment unit responsive to the signal.

In accordance with some embodiments the nitrogen species concentration sensor is configured to output a signal indicative of a concentration of at least one of ammonia and nitrate in the wastewater in the aerated biological treatment unit.

In accordance with some embodiments the control system is configured to increase a flow of the oxygen containing aeration gas responsive to the signal being indicative of a concentration of ammonia in the wastewater in the aerated biological treatment unit exceeding a target ammonia concentration.

In accordance with some embodiments the control system is configured to increase the flow of the aeration gas responsive to the signal being indicative of a concentration of ammonia in the wastewater in the aerated biological treatment unit exceeding about five milligrams per liter.

In accordance with some embodiments the control system is configured to decrease a flow of the aeration gas responsive to the signal being indicative of a concentration of nitrate in the wastewater in the aerated biological treatment unit exceeding a target nitrate concentration.

In accordance with some embodiments the control system is configured to decrease the flow of the aeration gas responsive to the signal being indicative of the concentration of nitrate in the wastewater in the aerated biological treatment unit exceeding about one milligram per liter.

In accordance with another aspect of the present disclosure there is provided method of modifying a water treatment system including an aerated biological treatment unit. The method comprises providing a nitrogen species concentration sensor for inclusion in the aerated biological treatment unit, the nitrogen species concentration sensor configured to output a signal indicative of a concentration of a nitrogen species in a wastewater present in the aerated biological treatment unit and providing a control system configured to adjust a flow of an oxygen containing aeration gas into the wastewater in the aerated biological treatment unit responsive to the signal.

In accordance with some embodiments the nitrogen species concentration sensor is configured to output a signal indicative of a concentration of at least one of ammonia and nitrate in the wastewater in the aerated biological treatment unit.

In accordance with some embodiments the control system is configured to increase a flow of the aeration gas responsive to the signal being indicative of a concentration of ammonia in the wastewater in the aerated biological treatment unit exceeding a target concentration.

In accordance with some embodiments the control system is configured to decrease a flow of the aeration gas responsive to the signal being indicative of a concentration of nitrate in the wastewater in the aerated biological treatment unit exceeding a target concentration.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The presence of nitrogen and phosphorous in wastewater introduced into surface waters are primary causes of cultural eutrophication (i.e., nutrient enrichment due to human activity) in the surface waters. The most recognizable manifestations of this eutrophication are algal blooms that occur during the summer Chronic symptoms of over-enrichment include low dissolved oxygen, fish kills, murky water, and depletion of desirable flora and fauna. In addition, the increase in algae and turbidity increases the need to chlorinate drinking water, which in turn, leads to higher levels of disinfection by-products that have been shown to increase the risk of cancer. Excessive amounts of nutrients can also stimulate the activity of microbes, such as *Pfisteria* which may be harmful to human health (Grubbs, Geoffrey, Director of Science and Technology, United States Environmental Protection Agency, *Memorandum: Development and Adoption of Nutrient Criteria into Water Quality Standards*, Nov. 14, 2001).

Approximately 25% of all water body impairments are due to nutrient-related causes, for example, nutrients, oxygen depletion, algal growth, ammonia, harmful algal blooms, biological integrity and turbidity (United States Environmental Protection Agency, *National Section* 303(d) *List Fact Sheet,* 2007). In efforts to reduce the number of nutrient impairments, many point source dischargers have received more stringent effluent limits for nitrogen and phosphorous. Biological nutrient removal systems are utilized to remove total nitrogen and total phosphorous from wastewater through the use of microorganisms under different environmental conditions in the treatment process (Metcalf & Eddy, Tchobanoglous, George, and Burton, Franklin L. (2002). *Wastewater Engineering: Treatment and Reuse* ($4^{th}$ ed.). McGraw-Hill).

One or more aspects of the methods and systems disclosed herein relate to a method of treating wastewater. As used herein, the terms "feed," "wastewater stream," and "wastewater" refer to water to be treated, such as streams of bodies of water from residential, commercial, or municipal, industrial, and agricultural sources, as well as mixtures thereof, that may contain at least one undesirable species, or pollutant, comprised of biodegradable, inorganic or organic materials that can be decomposed or converted by biological processes into environmentally benign, or at least less objectionable, compounds. More specifically, the undesirable constituent may be a biodegradable material, such as an inorganic or organic compound that participates or is involved in the metabolism of a microorganism. For example, the undesirable constituent may include nitrate, nitrite, phosphorous, ammonia, and the like. The type and concentration of undesirable constituents present in the wastewater may be site-specific. The water to be treated can also contain biological solids, inert materials, organic compounds, including recalcitrant or a class of compounds that are difficult to biodegrade relative to other organic compounds, as well as constituents from ancillary treatment operations such as, but not limited to, nitrosamines and endocrine disruptors. Wastewater present in a wastewater treatment system which has undergone partial treatment may also be referred to herein as "wastewater."

As used herein, the term "wastewater treatment system" is a system, typically a biological treatment system, having a population of microorganisms, including a diversity of types of bacteria, used to decompose biodegradable material. The conversion of pollutants to innocuous compounds is typically facilitated or mediated by the microorganisms as the wastewater is passed through the wastewater treatment system. A biomass of microorganisms typically requires an environment that provides the proper conditions for growth or biological activity.

In accordance with one or more embodiments, the disclosure relates to one or more systems and methods for treating wastewater. The wastewater treatment system may receive wastewater from a community, industrial or residential source. For example, the wastewater may be delivered from a municipal or other large-scale sewage system. Alternatively, the wastewater may be generated, for example, by food processing or pulp and paper plants. The wastewater may be moved through the system by operations upstream or downstream of the system.

According to one or more embodiments of the disclosure, a wastewater treatment system may include one or more treatment units each having one or more treatment zones. As used herein, the term "treatment zone" is used to denote an individual treatment region, which can be characterized as promoting, effecting, or exhibiting a type of metabolic activity or biological process. Multiple treatment regions or zones may be housed in a single vessel. Alternatively, a treatment region or zone may be housed in a separate vessel, wherein a different treatment is carried out in each separate vessel. The treatment zones may be sized and shaped according to a desired application and to accommodate a volume of wastewater to be treated. For example, hydraulic residence times of various unit operations of the treatment system may depend on factors such as influent flow rate, effluent requirements, concentration of target compounds in the influent stream, temperature, and expected peak variations of any of these factors.

Each treatment zone may contain a fluidizable media to host microorganisms. Each treatment zone may be maintained at different conditions to enhance growth of different microorganisms. Without being bound by any particular theory, different microorganisms may promote different biological processes. For example, passing wastewater through denitrifying bacteria may increase the efficiency of a denitrifying process. Likewise, passing wastewater through nitrifying bacteria may increase the efficiency of a nitrifying process.

The treatment units may also comprise means for maintaining the fluidizable media within each treatment zone during operation. For example, a screen, perforated plate, baffle, or fluid countercurrents may be used to maintain the fluidizable media within each treatment zone. The fluidizable media may, but need not be, similar in each treatment zone.

Prior to normal operation, the system may undergo a period of startup. Startup may involve biomass acclimation to establish a population of bacteria. Startup may run from several minutes to several weeks, for example, until a steady-state condition of biological activity has been achieved in one or more treatment unit operations.

Wastewater treatment processes in accordance with embodiments of the present disclosure may include multiple treatment areas or zones which can be roughly broken down into: (1) a preliminary treatment area; (2) a primary treatment area; and (3) a secondary treatment area.

The wastewater treatment process begins in the preliminary treatment area. Preliminary treatment is concerned with removing grit, sand, gravel, and damaging debris, such as cans, rags, etc., from untreated wastewater. This may be a two-stage treatment process whereby debris such as rags and cans are removed by screens and the grit and heavier inorganic solids settle out of the untreated wastewater as they pass through a velocity controlled zone. The damaging inorganic debris are thus removed by screening or settling, while any organic matter carried within the wastewater stream is transported forward to undergo further processing.

Following the preliminary treatment area, the wastewater is directed to a primary treatment area. The primary treatment area entails a physical process wherein a portion of the organic contaminants in the wastewater may be removed by flotation or sedimentation. The organic contaminants removed may include, for example, feces, food particles, grease, and paper. These organic contaminants are referred to herein as suspended solids. Primary treatment operations or systems can involve at least partial equalization, neutralization, and/or removal of largely insoluble material of the wastewater such as, but not limited to, fats, oils, and grease. In certain instances, 40-70% of the suspended solids are removed in this primary stage. The pretreatment and primary treatment operations may be combined. For example, primary clarifiers may be utilized to separate solids.

The third treatment stage is called secondary treatment and may comprise one or more biological treatment processes where bacteria are used under controlled conditions to remove nutrients or nonsettling suspended and soluble organics from the wastewater. These materials would result in an unacceptable biological oxygen demand (BOD) if left untreated. Secondary treatment may employ a biomass with bacteria or a consortium of microorganisms to at least partially hydrolyze or convert biodegradable material such as, but not limited to, sugar, fat, organic molecules, and compounds that create an oxygen demand in the water. For example, one mode of this process may comprise a vessel where wastewater is mixed with a suspension of microorganisms. This mixture is then aerated to provide oxygen for the support of the microorganisms that may then adsorb, assimilate, and metabolize the excess biological oxygen demand in the wastewater. After a sufficient retention time, the mixture is then introduced into a clarifier or settler into which the biomass separates as settled sludge from the liquid. The purified fluid may then overflow into a receiving stream.

Post-treatment or polishing operations or systems can include biological treatments, chemical treatments, and/or separation systems. The post-treatment operations may include processes that involve biological nitrification/denitrification and phosphorus removal. Chemical treatments that can be used may include chemical oxidation and chemical precipitation. Separation systems can include dissolved inorganic solids removal by ion exchange, ultrafiltration, reverse osmosis, or electrodialysis. Further treatment processes can involve disinfection, decontamination, or inactivation of at least a portion of any residual microorganisms by chemical or physical means. For example, disinfection can be effected by exposure to any one or more of oxidizing agents or to actinic radiation. Commercially available separation systems that may be utilized in some embodiments of the disclosure include those employing the CMF-S™ continuous membrane filtration modules as well as the MEMCOR® CMF (Pressurized) XP, CP, and XS membrane filtration systems, from Siemens Industry, Inc. (Alpharetta, Ga.). Other separators that can be used include filter presses and centrifuges.

One or more aspects of the present disclosure involve embodiments directed to the removal of or for the reduction of the level of one or more contaminants from wastewater. One or more aspects of the disclosure relate to wastewater treatment systems and methods of operation and methods of modification thereof.

Typically, water to be treated, such as wastewater or a wastewater stream, contains waste matter that, in some instances, can comprise solids and soluble and insoluble organic and inorganic material. Prior to discharge to the environment, such streams may require treatment to decontaminate or at least partially render the wastewater streams benign or at least satisfactory for discharge under established regulatory requirements or guidelines. For example, the water can be treated to reduce its nitrogen content to within acceptable limits One of the types of contaminants removed from wastewater in various aspects and embodiments of the present disclosure includes nitrogen species. The removal of nitrogen species from wastewater may involve the removal of total nitrogen compounds that comprise ammonia, nitrate, particulate organic nitrogen, and/or soluble organic nitrogen. The removal process may involve nitrification and denitrification processes.

Nitrification is a microbial process by which ammonia is sequentially oxidized to nitrite and then to nitrate. The nitrification process is accomplished primarily by two groups of autotrophic nitrifying bacteria that can build organic molecules by using energy obtained from inorganic sources, for example, ammonia or nitrite.

Once introduced into the aquatic environment, nitrogen can exist in many forms; dissolved nitrogen gas ($N_2$), ammonia ($NH_4^+$ and $NH_3$), nitrite ($NO_2^-$), nitrate ($NO_3^-$), and organic nitrogen as proteinaceous matter or in dissolved or particulate phases.

In the first step of nitrification, ammonia-oxidizing bacteria oxidize ammonia to nitrite by the equation:

$$NH_3 + O_2 \rightarrow NO_2^- + 3H^+ + 2e^-$$

Nitrosomas is the most frequently identified genus associated with this step, although other genera including Nitrosococcus and Nitrosospira may be involved. The subgenera Nitrosolobus and Nitrosovibrao can also autotrophically oxidize ammonia.

In the second step of the process, nitrite-oxidizing bacteria oxidize nitrite to nitrate according to the equation:

$$NO_2^- + H_2O \rightarrow NO_3^- + 2H^+ + 2e^-$$

Nitrobacter is the genus most frequently associated with this second step, although other genera such as Nitrospina, Nitrococcus and Nitrospira can also autotrophically oxidize nitrite.

Denitrification is the process by which nitrates are reduced to gaseous nitrogen by facultative anaerobes. Facultative anaerobes, such as fungi, can flourish in anoxic conditions because they have the ability to break down oxygen-containing compounds such as nitrate to obtain oxygen. The energy reactions associated with denitrification using methanol as a source of carbon are:

$$6NO_3^- + 2CH_3OH \rightarrow 6NO_2^- + CO_2 + 4H_2O \qquad \text{Step 1}$$

$$6NO_2^- + 3CH_3OH \rightarrow 3N_2 + 3CO_2 + 3H_2O + 6OH^- \qquad \text{Step 2}$$

$$6NO_3^- + 5CH_3OH \rightarrow 5CO_2 + 3N_2 + 7H_2O + 6OH^- \qquad \text{Overall}$$

The organisms carrying out this process are called denitrifiers. In general, they are heterotrophic bacteria that metabolize readily biodegradable substrate under anoxic conditions using nitrate as the electron acceptor. If oxygen is available, these bacteria will metabolize the oxygen before the nitrate. Therefore, the concentration of dissolved oxygen should be maintained at a low level for the denitrification process to function efficiently. Oxygen is typically minimized by avoiding or limiting aeration of the wastewater and by maintaining a high concentration of biological oxygen demand (BOD) so that the microorganisms use all the oxygen.

Measuring dissolved oxygen to control aeration is typically not effective because there is no way of knowing if the aeration input is too low. A dissolved oxygen measurement of zero could be obtained in an instance in which there was just sufficient oxygen supplied to provide for nitrification of all or significantly all of the ammonia in a biological treatment unit. A dissolved oxygen measurement of zero could also be obtained in an instance in which there was insufficient oxygen supplied to provide for nitrification of a desired amount of the ammonia in a biological treatment unit. Further, if a dissolved oxygen measurement indicated a very low dissolved oxygen level, for example, about 0.1 mg/L, this level of dissolved oxygen may already be undesirably high. Thus, the typical method of controlling aeration involves measuring the oxidation reduction potential (ORP) of liquid in the biological treatment unit. When using ORP, an electrical potential is measured. Typically, aeration in an aerated anoxic treatment unit is controlled to achieve an ORP level of about −150 mV. However, ORP is not a specific measure of any particular parameter (it is a "potential") and the set point often changes as wastewater quality changes. For instance, the presence of an oxidizing agent such as chlorine can change the ORP measurement. It would be desirable to provide a method to control the denitrification process more effectively than the present method of monitoring ORP and adjusting the aeration system responsive to a measured ORP value.

In one embodiment, nitrate or ammonia concentration in effluent from a wastewater treatment system is measured inline. The inline measurement of nitrate or ammonia can be performed utilizing a system comprising a device that utilizes an ion specific probe or by monitoring a change in color of a liquid sample in response to the addition of certain reagents (referred to as colorimetric analysis). Embodiments of the present disclosure are not restricted to a particular type of nitrate or ammonia concentration analysis. Nitrate concentration in treated water output from a wastewater treatment system or in effluent from one or more of the treatment unit operations could be measured to inform an operator or control system of the wastewater treatment system of a need to adjust a rate of aeration to one or more of the biological treatment units of the system, for example, an aerated anoxic treatment unit. However, because of the lag time in a multi-treatment unit system, this control strategy can become difficult to effectively implement. Monitoring the nitrate or ammonia concentration at an intermediary point, for example, in the first treatment unit of a three treatment unit system may provide data to more effectively inform the operator or control system of the wastewater treatment system of a need to adjust a rate of aeration to one or more of the biological treatment units of the system. In a wastewater treatment system including three biological treatment units the concentration of the nitrate or ammonia in the first treatment unit may be compared to the nitrate or ammonia concentration found in effluent from the third treatment unit. A correlation may be established between the concentration of the nitrate or ammonia in the first treatment unit and the nitrate or ammonia concentration found in the effluent from the third treatment unit. This correlation can then be used to define a target or maximum desired nitrate or ammonia concentration in the first treatment unit. An operator or control system could then adjust the aeration of a nitrification/denitrification process responsive to measurements of the nitrate or ammonia in the first treatment unit to achieve a desired nitrate or ammonia concentration in the effluent from the third treatment unit.

It may be desirable to provide a readily biodegradable organic compound (a carbon source) to the denitrifying bacteria. Since denitrification may in some treatment systems occur downstream of aerobic treatment techniques where most organic material is oxidized, an additional source of carbon may desirably be added to the process to sustain the growth of the denitrifying bacteria. The carbon source may include methanol although ethanol and acetic acid can also or alternatively be used. In other embodiments, the carbon source may include primary sludge, for example, as described in co-pending PCT application number PCT/US12/57086 titled "USE OF PRIMARY SLUDGE FOR CARBON SOURCE IN AN AERATED-ANOXIC BIORE- ACTOR SYSTEM" filed Sep. 25, 2012, which is incorporated herein by reference in its entirety for all purposes.

In at least one embodiment, a method of treating wastewater may comprise introducing wastewater into a primary separator prior to biological treatment. As used herein, the term "primary separator" refers to a separator that mechanically or physically separates suspended solids from the wastewater. In certain embodiments, suspended solids are allowed to settle over a period of time using gravity. In some embodiments, a large amount, for example, about 60% of total suspended solids (TSS) may be removed using gravity separation. A primary separator may be one component in a primary treatment process. The primary treatment process may be a physical settling or retention process, where organics may be removed from the wastewater through flotation or sedimentation. Non-limiting examples of clarifiers or components thereof that can be utilized in one or more configurations of the present treatment systems include, but are not limited to the ENVIREX® FLOC-CLARIFIER system, the RIM-FLO® circular clarifier, and the TRANS-FLO® clarifier, from Siemens Industry, Inc.

In certain embodiments, the primary separator may use magnetic particles to separate the suspended solids from the wastewater. For example, magnetic separation techniques may be used such as those described in U.S. Pat. No. 7,695,623, "SYSTEM AND METHOD FOR ENHANCING AN ACTIVATED SLUDGE PROCESS" which is incorporated herein by reference in its entirety.

One or more of the embodiments disclosed herein may comprise one or more biological treatment units. As used herein, the term "biological treatment unit" refers to a reactor where a biological treatment process takes place. In certain embodiments, the biological treatment unit is at least one biological reactor selected from the group consisting of an anaerobic reactor, an anoxic reactor, and an aerobic reactor.

In certain embodiments, effluent from the primary separator may be introduced to an aerated anoxic biological treatment unit. As used herein, the terms "aerated anoxic biological treatment unit," "aerated anoxic reactor," and "anoxic reactor" refer to a biological reactor where a constant oxygen deficit condition is maintained and the overall oxygen delivery is less than the overall oxygen demand. The wastewater and/or sludge in the anoxic reactor may be aerated and mixed for a period of time using diffusers or aerators. In certain aspects, the anoxic reactor functions as a nitrification/denitrification reactor, where ammonia and/or nitrate-nitrogen present in the influent is converted to elemental nitrogen. While oxygen may be present in a form that is combined with nitrogen, there may be no significant amount of dissolved oxygen present in the anoxic reactor. In certain aspects, optimal denitrification may require that the overall oxygen delivery not only be less than the demand, but must also be less than the demand minus the oxygen recovered through denitrification. The environmental conditions in the anoxic reactor may maintain dissolved oxygen (DO) concentrations at less than about 0.5 milligrams per liter (mg/L). The effluent or wastewater being treated may be held within the anoxic reactor for a designated period of time. The anoxic reactor may serve to denitrify, or reduce the nitrate and nitrite levels of the wastewater. This may be accomplished because the microorganisms are continuing to seek oxygen and the lack of oxygen in a dissolved form forces them to reduce the nitrate and nitrite compounds to nitrogen gas. This leaves nitrogen in a stable gaseous form ($N_2$) and consequently permits it to escape the liquid surface.

In one or more embodiments, one or more process parameters in the aerated biological treatment unit may be measured to obtain a value. The process parameter may be any parameter that correlates with the functionality of the reactor, such as flow rates, material properties, and treatment conditions. For example, the process parameter may be a BOD level, such as the concentration of soluble BOD, or the concentration of suspended BOD. In other examples, the process parameter may be a concentration of chemical species, for example, oxygen or a nitrogen species, for example, ammonia, ammonium, nitrite, or nitrate. The process parameter may be measured by one or more sensors placed in the treatment unit or in a process stream that is in communication with the treatment unit. Alternatively, the process parameter may be measured from a sample of material removed from the treatment system and analyzed in a separate location. The control system may be configured to compare the value of the one or more process parameters with a target value to obtain a result. The control system may respond to the result by controlling one or more elements of the treatment system. In certain instances, the control system may be configured to adjust a flow rate of an oxygen containing gas or an aeration gas introduced into the aerated anoxic reactor responsive to the result. For example, if the concentration of ammonia in the aerated anoxic reactor is too high, the control system may be configured to direct an aeration system to introduce a higher flow rate of oxygen into the aerated anoxic reactor. In another example, if the concentration of nitrate in the aerated anoxic reactor is too high, the control system may be configured to direct an aeration system to introduce a lower flow rate of oxygen into the aerated anoxic reactor.

In further embodiments, anoxically treated liquid formed in the aerated anoxic biological treatment unit may be introduced into an aerobic treatment unit. The term "aerobic" as used herein refers, in general, to the presence of oxygen at a level of, for example, about 2 mg/L or more. The aerobic treatment unit may be maintained under aerobic conditions to promote the growth and/or metabolic activity of aerobic bacteria. The aerobic bacteria may, for example, facilitate and/or enhance the efficiency of a nitrifying process. The aerobic bacteria may also, for example, facilitate and/or enhance the efficiency of a phosphorus uptake process in which soluble phosphorous is restored to the bacteria. In at least one embodiment, the anoxically treated liquid may be treated in the aerobic treatment unit to form an aerobically treated liquid. In some embodiments, conditions may be provided or maintained in the aerobic treatment unit so that at least a portion of the anoxically treated liquid is formed into aerobically treated liquid. In a further embodiment, an aerobically treated sludge may be separated from the aerobically treated liquid. In certain instances, a portion of the sludge may be introduced to the aerated anoxic biological treatment unit as a source of carbon. In yet a further embodiment, the aerobically treated liquid may be introduced into a secondary separator. In some cases, solids may be removed from the aerobically treated liquid in the secondary separator. A portion of the removed solids may be introduced into the aerated anoxic biological treatment unit.

In various embodiments, the wastewater treatment system may comprise an anaerobic treatment unit. The anaerobic treatment unit may be maintained under anaerobic conditions to promote the growth and/or metabolic activity of anaerobic bacteria. The term "anaerobic conditions," as used herein, refers to an absence of oxygen. For example, the environment in the anaerobic reactor may be maintained at a concentration of less than 0.2 mg/L of DO. The anaerobic bacteria may, for example, facilitate and/or enhance the efficiency of a phosphorous release process in which the bacteria may take up volatile fatty acids through a mechanism involving hydrolysis and release of phosphate.

According to one or more embodiments, the wastewater treatment system may comprise a membrane bioreactor system. The membrane bioreactor system may comprise one or more porous or semi-permeable membranes. The membranes may be positioned so as to be submerged during operation and may have any configuration suitable for a particular purpose, such as a sheet or hollow tube. The membrane may be formed of any material (natural or synthetic) suitable for a particular filtration process.

One or more membranes may be positioned in one or more membrane modules within the membrane bioreactor system. The membrane modules may have any shape and cross-sectional area suitable for use in a desired application, for example, square, rectangular, or cylindrical. Multiple membrane modules may be positioned adjacent to one another or at predetermined positions within the membrane bioreactor system. The membrane modules may be positioned at any angle, including vertical and horizontal, within the membrane bioreactor system.

In accordance with one or more embodiments, a wastewater treatment system may be provided. The wastewater treatment system may comprise a primary separator. The primary separator may be provided and characterized as previously discussed and may be in fluid communication with a source of wastewater. The primary separator may comprise one or more outlets. For example, the primary separator may comprise a first outlet and a second outlet. The primary separator may be configured to output primary sludge from the first outlet and to output an effluent from the second outlet.

In a further embodiment, the wastewater treatment system comprises a biological treatment unit. The biological treatment unit may be provided and characterized as previously discussed. In certain embodiments, the biological treatment unit may include one or more inlets. For example, the biological treatment unit may include a first inlet and a second inlet. A first inlet of the biological treatment unit may be in fluid communication with the second outlet of the primary separator. In one or more embodiments, the biological treatment unit may be an aerated anoxic treatment unit.

According to one or more embodiments, the wastewater treatment system may further comprise a control system. The control system may strategically manage the concentration of oxygen in various process streams within the system to facilitate pollutant removal. Oxygen may be present in various forms within the different elements of the system. For example, process streams within the system may contain dissolved oxygen and/or oxygenated species, such as, but not limited to, nitrates and nitrites, any of which may either originate in the wastewater or be produced by treatment processes occurring with one or more elements of the treatment system, such as an aerated anoxic treatment unit. Without being bound by any particular theory, the presence of oxygen may promote certain biological processes, such as aerobic biological processes, while inhibiting others such as anaerobic biological processes. More specifically, oxygen may interfere with portions of metabolic schemes involved in the biological removal of nitrogen. Oxygen may also interfere with a release of phosphorous, which may in turn limit the uptake of phosphorous. Thus, delivering process streams with a high concentration of oxygen to one or more elements of the treatment system, such as treatment units where oxygen may promote biological activity, and reducing the concentration of oxygen in process streams delivered to treatment units where oxygen may interfere with biological processes, may be beneficial. Strategic management of the concentration of oxygen in streams within the wastewater treatment system may allow reduced equipment size, faster reaction rates, and overall improved biological removal of pollutants.

The control system may comprise one or more sensors. Non-limiting examples of sensors suitable for use in the methods and systems described herein may include DO galvanic probes, DO optical probes, ORP probes, ammonia concentration probes or sensors, nitrate concentration probes or sensors, or any sensor capable of detecting the concentration of oxygen, nitrate, and/or ammonia present at any point within the treatment system, as well as or any other sensor that measures process conditions. The sensor may be positioned, for example, so as to determine the concentration of oxygen, nitrate, and/or ammonia in a process stream entering the aerated anoxic treatment unit or in liquid within the aerated anoxic treatment unit. In certain embodiments, the sensors may detect or measure a process parameter and report the value to the control system. The control system may be configured to compare the detected or measured value with a target value. Responsive to a result of the comparison, the control system may be configured to select a flow rate of oxygen and/or aeration gas to be introduced into the aerated anoxic treatment unit.

In certain embodiments, the wastewater treatment system further comprises an aerobic treatment unit. The aerobic treatment unit may comprise one or more inlets. For example, the aerobic treatment unit may comprise an inlet in fluid communication with an effluent outlet of the aerated anoxic treatment unit. In a further embodiment, a second inlet of the aerated anoxic treatment unit is in fluid communication with an outlet of the aerobic treatment unit.

In yet a further embodiment, the wastewater treatment system further comprises a secondary separator. The secondary separator may use any one of the separation techniques (gravity, magnetic media, etc.) as discussed above. The secondary separator may include one or more inlets and one or more outlets. In some embodiments, the inlet of the secondary separator may be in fluid communication with an effluent outlet of the aerobic treatment unit. In certain embodiments, an outlet of the secondary separator may be configured to output activated sludge. In various embodiments, a third inlet of the aerated anoxic treatment unit may be in fluid communication with the outlet of the secondary separator.

In certain embodiments, the wastewater treatment system may further comprise a measurement system. The measurement system may be in communication with the control system. In some embodiments, the measurement system may function as one or more components of a control system. The measurement system may be in communication with one or more sensors in the treatment system, as previously discussed. In various embodiments, the measurement system may be configured to measure one or more process parameters. For example, the measurement system may be configured to measure a level of BOD in the biological treatment unit. The measurement system may also be configured to measure a ratio of BOD to TKN in the effluent from the primary separator. The measurement system may also or alternatively be configured to measure a concentration of nitrate and/or ammonia in wastewater in an aerated anoxic treatment unit and/or in effluent from an aerobic treatment unit of the wastewater treatment system.

Figure 1:
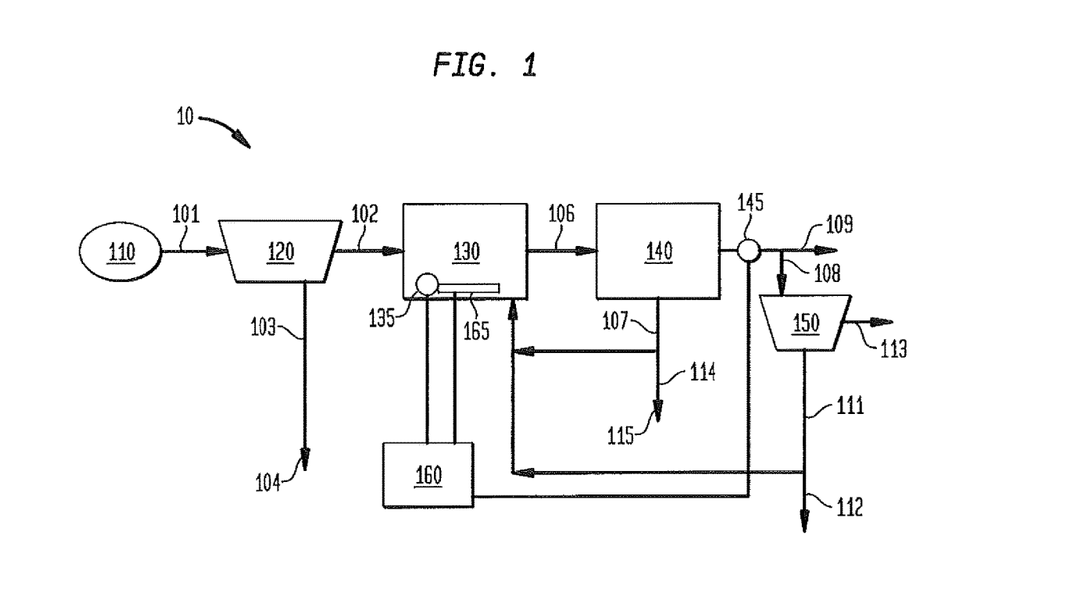
FIG. 1 is a flow diagram illustrating a representative treatment system pertinent to one or more aspects of the disclosure.

FIG. 1 illustrates a wastewater treatment system 10 in accordance with one or more embodiments of the present disclosure. The wastewater treatment system includes a source of wastewater 110 fluidly connected through conduit or distribution system 101 to a first treatment unit 120. The first treatment unit may include a primary clarifier. The primary clarifier may produce a first effluent and a primary sludge. The first effluent may be directed through a conduit or distribution system 102 to a second treatment unit 130. The primary sludge from the primary clarifier may be directed through a conduit or distribution system 103 to a point of use 104, where the primary sludge may undergo further processing.

Second treatment unit 130 may be an aerated anoxic treatment unit. The second treatment unit 130 may include a nitrogen species concentration probe or sensor 135, or a plurality of such sensors, which is configured to measure a concentration of nitrate and/or ammonia in liquid, for example, wastewater in the second treatment unit and/or in effluent from the second treatment unit. The nitrogen species concentration sensor 135 is illustrated in FIG. 1 as being disposed within the second treatment unit 130, however, in other embodiments the nitrogen species concentration sensor 135 (or an additional nitrogen species concentration sensor) may be provided on an effluent outlet of the second treatment unit, for example, in or in fluid communication with the conduit or distribution system 106 or in a portion of the second treatment unit 130 proximate an effluent outlet of the second treatment unit 130. In some embodiments it is desirable to position the nitrogen species concentration sensor 135 at a location in the second treatment unit 130 where there is significant mixing of the contents of the second treatment unit 130 to provide a representative measurement of the conditions within the second treatment unit 130 as a whole.

The nitrogen species concentration sensor 135 may be an ammonia concentration sensor and/or a nitrate concentration sensor, for example, any one of the ammonia and/or nitrate sensors available from the Hach Company, Loveland, Colo. The nitrogen species concentration sensor 135 may communicate, electrically or otherwise, with a controller 160 to provide the controller with a signal indicative of a concentration of ammonia and/or nitrate in the second treatment unit 130. The controller 160 may control the operation of an aeration system 165 disposed in or configured to deliver an oxygen containing aeration gas to wastewater in the second treatment unit 130.

The second treatment unit may perform bacterial nitrification and denitrification and reduction of BOD levels to produce a second effluent in the form of an anoxically treated liquid. The second effluent may be directed through the conduit or distribution system 106 to a third treatment unit 140.

The third treatment unit 140 may aerobically treat the second effluent to produce a third effluent. The third effluent may be directed through a conduit or distribution system 108 to a fourth treatment unit 150. A nitrogen species concentration probe or sensor 145, which may be similar to the nitrogen species sensor 135, may be provided in the third treatment unit 140, in or on an effluent outlet of the third treatment apparatus 140, or in or in fluid communication with the conduit or distribution system 108 and may communicate with the controller 160 to provide the controller with a signal indicative of a concentration of ammonia and/or nitrate in effluent from the third treatment unit 140.

The third treatment unit 140 may be an aerobic treatment unit. Third treatment unit 140 may produce an aerobically treated sludge. A first portion of the aerobically treated sludge from third treatment apparatus 140 may be directed through a conduit or distribution system 107 to the second treatment apparatus 130. A second portion of the aerobically treated sludge may be directed through a conduit or distribution system 114 to a point of use 115, where the aerobically treated sludge may undergo further treatment or disposal.

Fourth treatment unit 150 may be a secondary separator. In addition to, or in the alternative to being introduced to the fourth treatment unit 150, the third effluent may be directed through a conduit or distribution system 109 to a point of use, where the third effluent or may undergo further processing.

The fourth treatment unit 150 may remove solids from the third effluent to produce a fourth effluent. A portion of the removed solids may be directed through a conduit or distribution system 111 to second treatment unit 130. In addition, or in the alternative to being introduced to second treatment unit 130, the removed solids may be directed through a conduit or distribution system 112 to a point of use, where the removed solids may undergo further processing. The fourth effluent may be directed through a conduit or distribution system 113 to a point of use, where the fourth effluent may undergo further processing or be disposed.

In different embodiments, controller 160 for monitoring electrical parameters from one or more sensors 614, for example sensors 135 and/or 145, and for controlling one or more portions of the wastewater treatment system, for example, the aeration system 165, may be embodied in any of numerous forms. In one example, a computerized controller for embodiments of the system disclosed herein is implemented using one or more computer systems 160 as exemplarily shown in FIG. 2. Computer system 160 may be, for example, a general-purpose computer such as those based on an Intel PENTIUM® or Core™ processor, a Motorola PowerPC® processor, a Sun UltraSPARC® processor, a Hewlett-Packard PA-RISC® processor, or any other type of processor or combinations thereof. Alternatively, the computer system may include specially-programmed, special-purpose hardware, for example, an application-specific integrated circuit (ASIC) or controllers intended specifically for wastewater treatment equipment.

Figure 2:
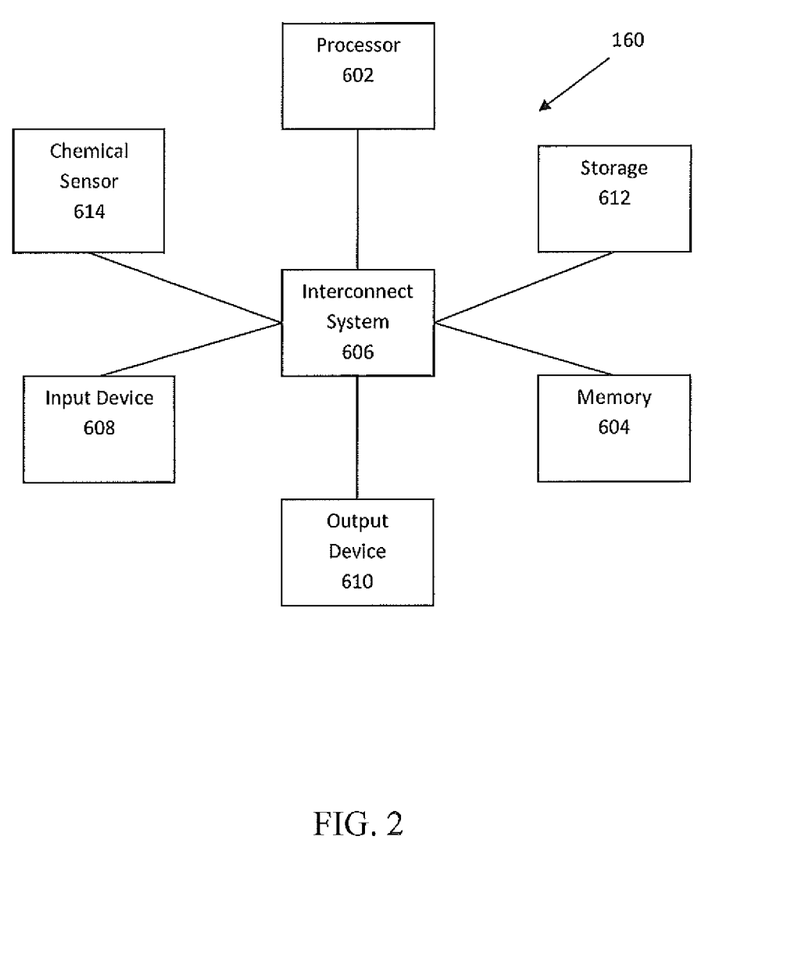
FIG. 2 is a block diagram of a control system pertinent to one or more aspects of the disclosure.

Computer system 160 can include one or more processors 602 typically connected to one or more memory devices 604, which can comprise, for example, any one or more of a disk drive memory, a flash memory device, a RAM memory device, or other device for storing data. Memory 604 is typically used for storing programs and data during operation of the controller and/or computer system 160. For example, memory 604 may be used for storing historical data relating to measured nitrogen species concentrations from the sensors 135, 145 over a period of time, as well as current sensor measurement data. Software, including programming code that implements embodiments of the disclosure, can be stored on a computer readable and/or writeable nonvolatile recording medium 612, and then copied into memory 604 wherein it can then be executed by processor 602. Such programming code may be written in any of a plurality of programming languages, for example, Java, Visual Basic, C, C#, or C++, Fortran, Pascal, Eiffel, Basic, COBAL, or any of a variety of combinations thereof.

Components of computer system 160 may be coupled by an interconnection mechanism 606, which may include one or more busses (e.g., between components that are integrated within a same device) and/or a network (e.g., between components that reside on separate discrete devices). The interconnection mechanism typically enables communications (e.g., data, instructions) to be exchanged between components of system 160.

Computer system 160 can also include one or more input devices 608, for example, a keyboard, mouse, trackball, microphone, touch screen, and one or more output devices 610, for example, a printing device, display screen, or speaker. Computer system may be linked, electronically or otherwise, to nitrogen species concentration sensors 135, 145, which may provide a signal indicative of a concentration of a nitrogen species in the second treatment unit 130 or in effluent from the second treatment unit 130 and in the effluent from the third treatment unit 140, respectively, to the computer system. In addition, computer system 160 may contain one or more interfaces (not shown) that can connect computer system 160 to a communication network (in addition or as an alternative to the network that may be formed by one or more of the components of system 160). This communications network, in some embodiments, forms a portion of a process control system for a wastewater treatment plant.

According to one or more embodiments, the one or more output devices 610 are coupled to another computer system or component so as to communicate with computer system 160 over a communication network. Such a configuration permits one sensor to be located at a significant distance from another sensor or allow any sensor to be located at a significant distance from any subsystem and/or the controller, while still providing data therebetween.

Although computer system 160 is shown by way of example as one type of computer system upon which various aspects of the disclosure may be practiced, it should be appreciated that the disclosure is not limited to being implemented in software, or on the computer system as exemplarily shown. Indeed, rather than implemented on, for example, a general purpose computer system, the controller, or components or subsections thereof, may alternatively be implemented as a dedicated system or as a dedicated programmable logic controller (PLC) or in a distributed control system. Further, it should be appreciated that one or more features or aspects of the control system may be implemented in software, hardware or firmware, or any combination thereof. For example, one or more segments of an algorithm executable computer system 160 can be performed in separate computers, which in turn, can be in communication through one or more networks.

Figure 3:
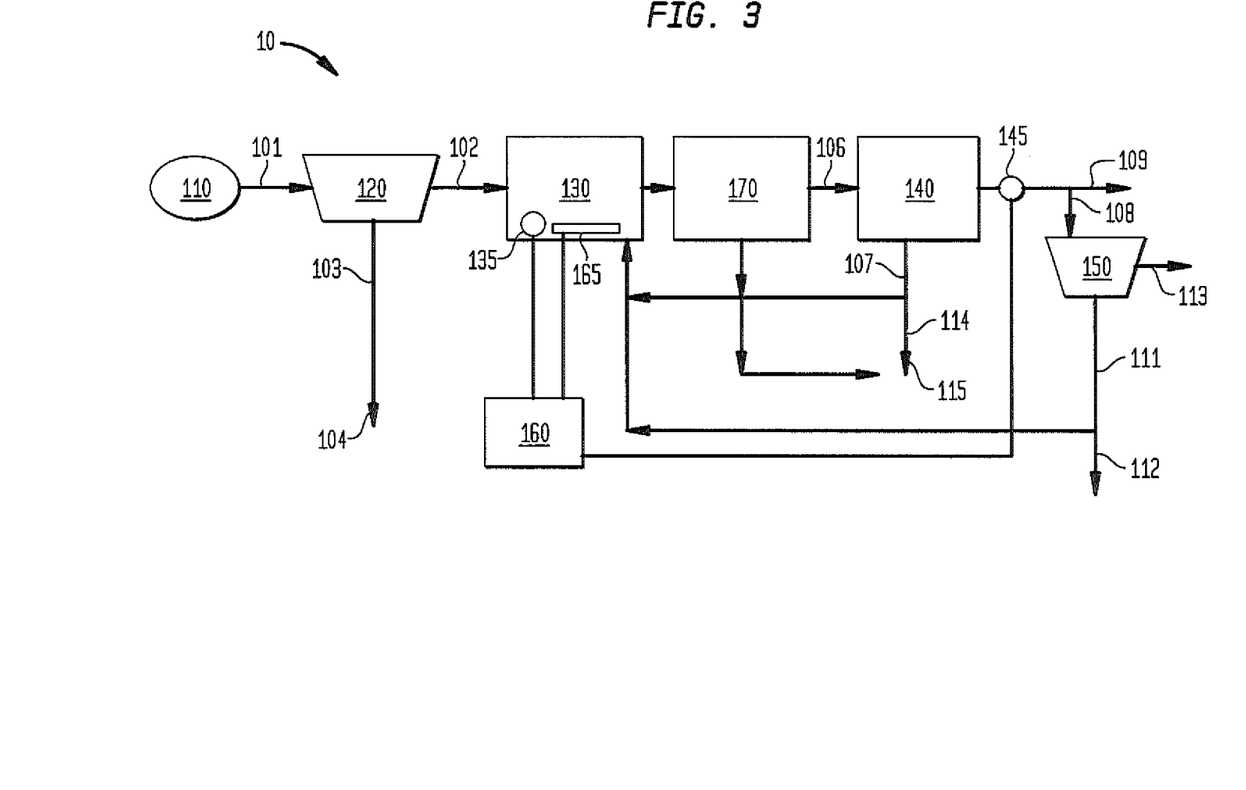
FIG. 3 is a flow diagram illustrating a representative treatment system pertinent to one or more aspects of the disclosure.

In some embodiments, for example, as illustrated in FIG. 3, one or more additional treatment units may be included in the wastewater treatment system 10. For example, in some embodiments an additional treatment unit 170 may be provided in fluid communication between the second treatment unit 130 and the third treatment unit 140. The additional treatment unit may be an aerated biological treatment unit operated under either aerobic or aerated anoxic conditions. Effluent produced in treatment unit 170 may be supplied to the third treatment unit 140. A first portion of treated sludge produced in the additional treatment unit 170 may be directed through a conduit or distribution system to the second treatment unit 130. A second portion of the treated sludge may be directed through a conduit or distribution system to a point of use 115, where the treated sludge may undergo further treatment or disposal.

Figure 4:
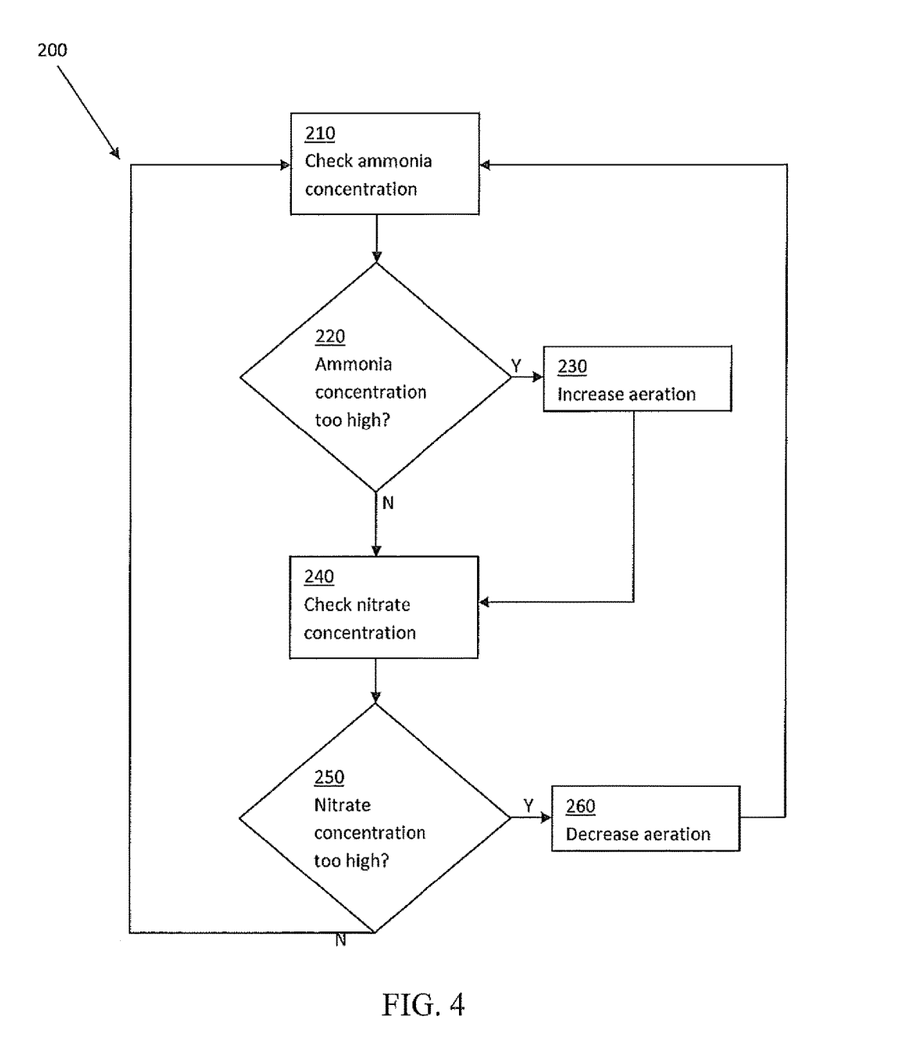
FIG. 4 is a flowchart of a method pertinent to one or more aspects of the disclosure.

A method of operating a control system as disclosed herein is illustrated generally at 200 in FIG. 4. During operation, the concentration of ammonia in second treatment unit 130 may be monitored (act 210) by the nitrogen species concentration sensor 135 and/or controller 160. The measured ammonia concentration is compared, for example, by the controller 160 to a desired or target concentration (decision 220). If the nitrogen species concentration sensor measures a concentration of ammonia in the second treatment unit being different from, for example, exceeding the desired or target concentration, the flow of oxygen and/or aeration gas into the second treatment unit from, for example, the aeration system 165 may be increased from a first level to a second level (act 230). This may be accomplished by either increasing the flow of aeration gas without altering the composition of the aeration gas, by increasing the oxygen content of the aeration gas and maintaining a constant flow rate or aeration gas, or a combination of both. The aeration system may be operated at the second level until the measured ammonia concentration returns to or drops below the desired or target concentration.

The concentration of nitrate in second treatment unit 130 may also or alternatively be monitored (act 240) by the nitrogen species concentration sensor 135 and/or controller 160. The measured nitrate concentration is compared, for example, by the controller 160 to a desired or target concentration (decision 250). If the nitrogen species concentration sensor measures a concentration of nitrate in the second treatment unit being different from, for example, exceeding the desired or target concentration, the flow of oxygen and/or aeration gas into the second treatment unit from, for example, the aeration system 165 may be decreased from a first level to a second level (act 260). This may be accomplished by either decreasing the flow of aeration gas without altering the composition of the aeration gas, by decreasing the oxygen content of the aeration gas and maintaining a constant flow rate or aeration gas, or a combination of both. The aeration system may be operated at the second level until the measured nitrate concentration returns to or drops below the desired or target concentration.

In an alternative embodiment, nitrogen species concentration sensor 145 may be utilized to measure a concentration of a nitrogen species, for example, ammonia or nitrate in the effluent from the second treatment unit 140. The measured concentration of the nitrogen species may then be compared, for example, by the controller 160, to a desired or target effluent nitrogen species concentration. The desired or target effluent nitrogen species concentration in the effluent from the second treatment unit 140 may be selected to satisfy regulations in a location in which the wastewater treatment system 10 is located. The desired or target effluent nitrogen species concentration may be, for example, less than about 1 mg/L of ammonia and/or between about 2 mg/L and about 5 mg/L of nitrate (or less than about 2 mg/L or about 5 mg/L of nitrate). These target concentrations are exemplary only and may vary depending upon a desired quality of water produced from the wastewater treatment system which may be determined to meet regulatory requirements of a particular locale in which the wastewater treatment system is operated.

If the controller 160 receives a signal from the nitrogen species concentration sensor 145 indicative of an ammonia or nitrate concentration being different from, for example, above a desired or target concentration, the controller 160 may provide a signal to the aeration system 165 to change an amount of oxygen and/or aeration gas provided to the second treatment unit. For example, if the ammonia concentration in the effluent is above the desired concentration the controller may instruct the aeration system to increase an amount of oxygen and/or aeration gas provided to the second treatment unit. The aeration system may respond by increasing a flow rate of oxygen and/or aeration gas to the second treatment unit. This may be accomplished by either increasing the flow of aeration gas without altering the composition of the aeration gas, by increasing the oxygen content of the aeration gas and maintaining a constant flow rate or aeration gas, or a combination of both. If the nitrate concentration in the effluent is above the desired concentration the controller may instruct the aeration system to decrease an amount of oxygen and/or aeration gas provided to the second treatment unit. The aeration system may respond by decreasing a flow rate of oxygen and/or aeration gas to the second treatment unit.

In some embodiments, both the nitrogen species concentration sensor 135 and the nitrogen species concentration sensor 145 may be utilized to measure a concentration of a nitrogen species, for example, ammonia or nitrate in each of wastewater in the second treatment unit 130 (and/or in effluent therefrom) and in the effluent from the second treatment unit 140, respectively. The controller 160 may adjust the aeration to the second treatment unit 140 responsive to either or both of the nitrogen species concentration sensor 135 and the nitrogen species concentration sensor 145 indicating a level of a nitrogen species exceeding a desired level.

Figure 5:
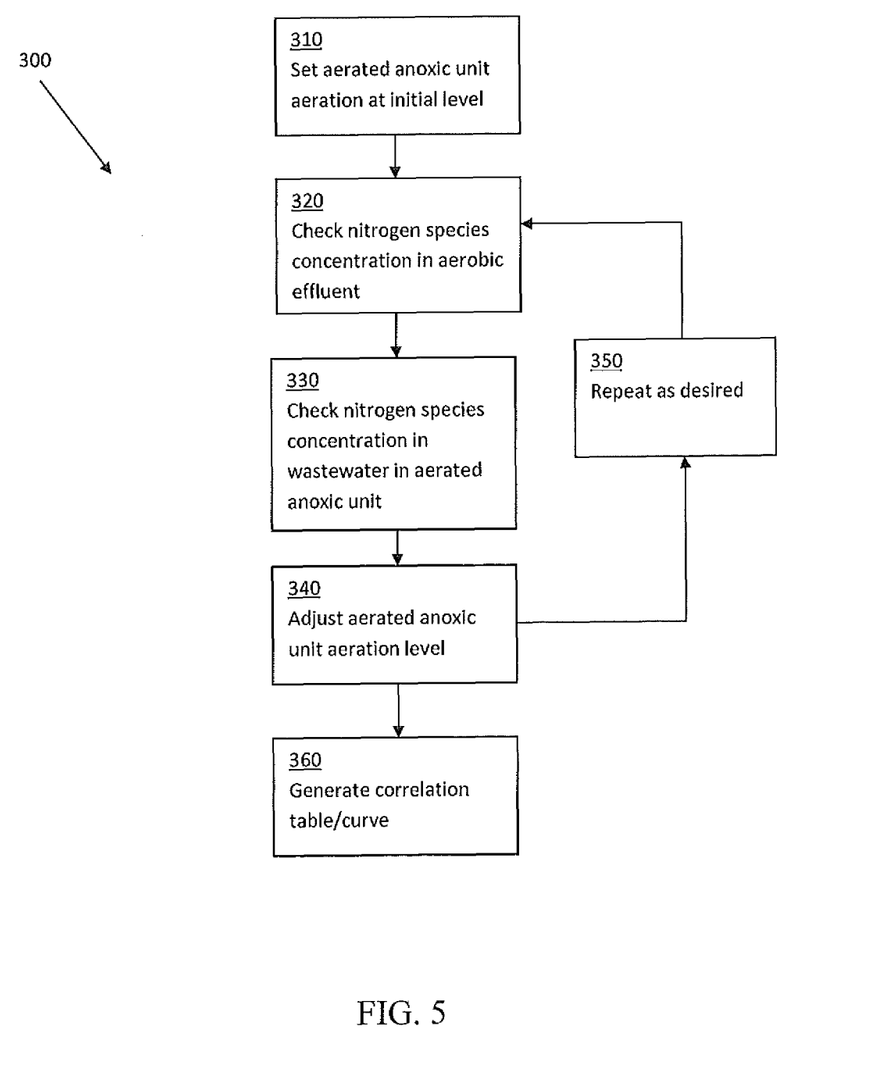
FIG. 5 is a flowchart of a method pertinent to one or more aspects of the disclosure.

The control system of the wastewater treatment system may be calibrated prior to beginning operation or may undergo periodic calibrations. These calibrations may be performed to generate a correlation chart or table correlating nitrogen species concentrations measured in the second treatment unit 130 or in effluent therefrom to expected nitrogen species concentrations in the effluent from the third treatment unit 140 or to determine a relationship between the nitrogen species concentrations measured in the second treatment unit 130 or in effluent therefrom and expected nitrogen species concentrations in the effluent from the third treatment unit 140. Such a method is illustrated in FIG. 5 indicated generally at 300. At act 310 the second treatment unit 130 is operated with a flow of aeration gas set at an initial level. The concentration of a nitrogen species of interest, for example, ammonia, nitrate, or both, is measured in both second treatment unit 130 (and/or in effluent therefrom) and in the effluent from the third treatment unit 140 (acts 320 and 330). The amount of oxygen supplied to the second treatment unit 130 may then be adjusted by altering the flow rate and/or oxygen concentration of the aeration gas supplied to the wastewater in the second treatment unit 130 (act 340). The system may be operated at the adjusted aeration level for a period of time sufficient to establish a steady state level of the nitrogen species in the wastewater in the second treatment unit 130 and in the effluent from the third treatment unit 140 and the measurements of the nitrogen species may be repeated (act 350). These acts may be repeated until a desired number of sets of data points are measured, for example a set of data points spanning an expected variation in the nitrogen species that might be expected to be observed in operation of the wastewater system. A correlation table or chart may then be generated (act 360) providing an indication of an expected nitrogen species concentration that would be expected to be observed in the effluent of the third treatment unit 140 given a particular nitrogen species measurement in the second treatment unit 130 and/or in effluent therefrom.

Additionally or alternatively, natural variations in the concentration of ammonia and/or nitrate in the effluent from the third treatment unit may be monitored over time and compared with measurements of the ammonia and/or nitrate concentration in the second treatment unit or in effluent therefrom. This comparison may be performed by the controller 160. The comparison may be utilized to determine a desired or target ammonia and/or nitrate concentration in the second treatment unit to achieve a concentration of a nitrogen species, for example, ammonia and/or nitrate in the effluent at or below the effluent target concentration.

The controller may then monitor the ammonia and/or nitrate concentration in the second treatment unit or in effluent from the second treatment unit to determine when and by how much to adjust the flow of oxygen and/or aeration gas into the second treatment unit. In some embodiments a desired, target, or maximum desired concentration of ammonia in the second treatment unit or in effluent from the second treatment unit may be set at about 3 mg/L or at about 4 mg/L or at a level intermediate between about 3 mg/L and about 4 mg/L. In some embodiments a desired, target, or maximum desired concentration of nitrate in the second treatment unit may be set at about 0.8 mg/L or at about 1 mg/L or at a level intermediate between about 0.8 mg/L and about 1 mg/L. These target concentrations are exemplary only and may vary depending upon a desired quality of water produced from the wastewater treatment system which may be determined to meet regulatory requirements of a particular locale in which the wastewater treatment system is operated.

In some embodiments, the controller may adjust the flow of oxygen and/or aeration gas into the second treatment unit 140 when a nitrogen species concentration in either the effluent from the third treatment unit or in wastewater in the second treatment unit exceeds or drops below a desired or target concentration by a predefined amount. For example, if the target concentration of nitrate in the second treatment unit is 0.8 mg/L and the target concentration of ammonia in the second treatment unit is 4 mg/L, the controller might decrease the flow of oxygen and/or aeration gas into the second treatment unit 140 only after the measured nitrate concentration exceeds about 1 mg/L and/or may increase the flow of oxygen and/or aeration gas into the second treatment unit 140 only after the measured ammonia concentration exceeds about 5 mg/L. Operation in this manner may provide a degree of hysteresis to the system so that the flow of oxygen and/or aeration gas into the second treatment unit is not constantly being adjusted upward and downward when the concentration of nitrate and/or ammonia in the effluent of the third treatment unit or in the second treatment unit or in the effluent from the second treatment unit is close to or at a target concentration.

EXAMPLE

A wastewater treatment system (Orbal™ Siemens Industry, Inc.) including three biological treatment units in series was modified to monitor the aerated-anoxic treatment unit (the furthest upstream treatment unit) for nitrate concentration. The size of the treatment system basin was 2.5 million gallons total, with the first biological treatment unit having a volume of approximately 1.25 million gallons in, the second biological treatment unit having a volume of about 0.825 million gallons, and the third biological treatment unit having a volume of about 0.425 million gallons. The system flow rate averaged about 2.5 million gallons per day for an overall hydraulic residence time of 1 day. The influent wastewater included on average about 0.8 mg/L of DO, 253 mg/L of chemical oxygen demand (COD), 57.9 mg/L total suspended solids (TSS), 27 mg/L ammonia, 0.37 mg/L nitrate, and had a pH of about 7.2.

Figure 6:
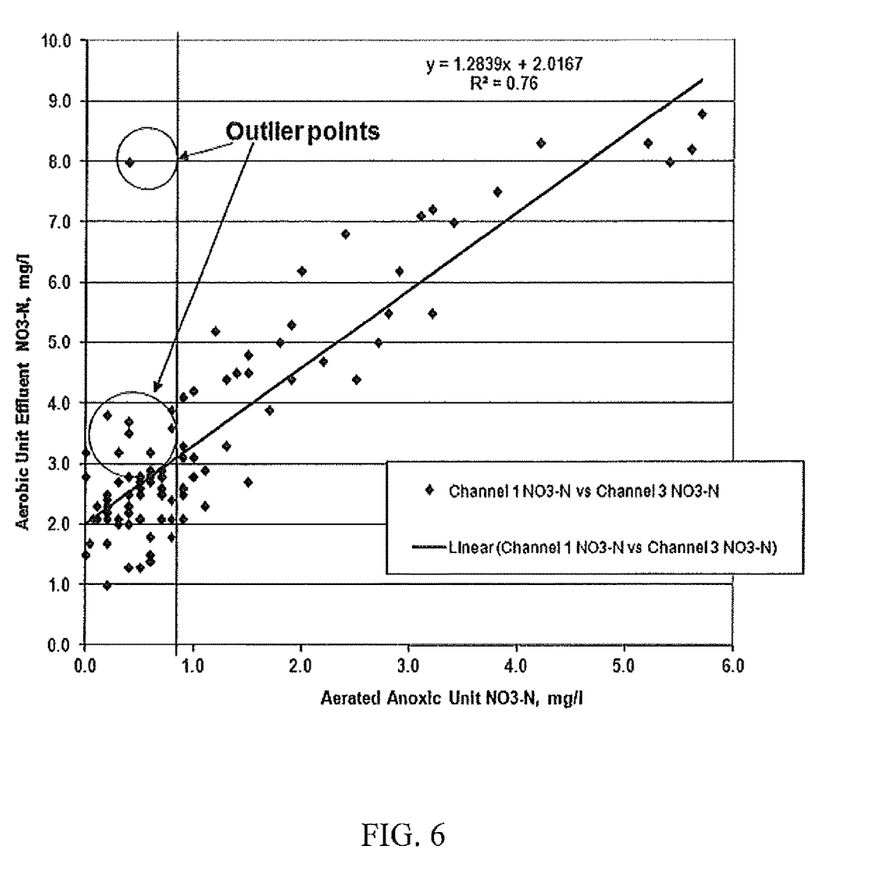
FIG. 6 is a graph of comparing measurements of nitrate concentration in wastewater in an aerated anoxic treatment unit of a wastewater treatment system to nitrate concentration in effluent of an aerobic treatment unit of the wastewater treatment system.
Figure 7:
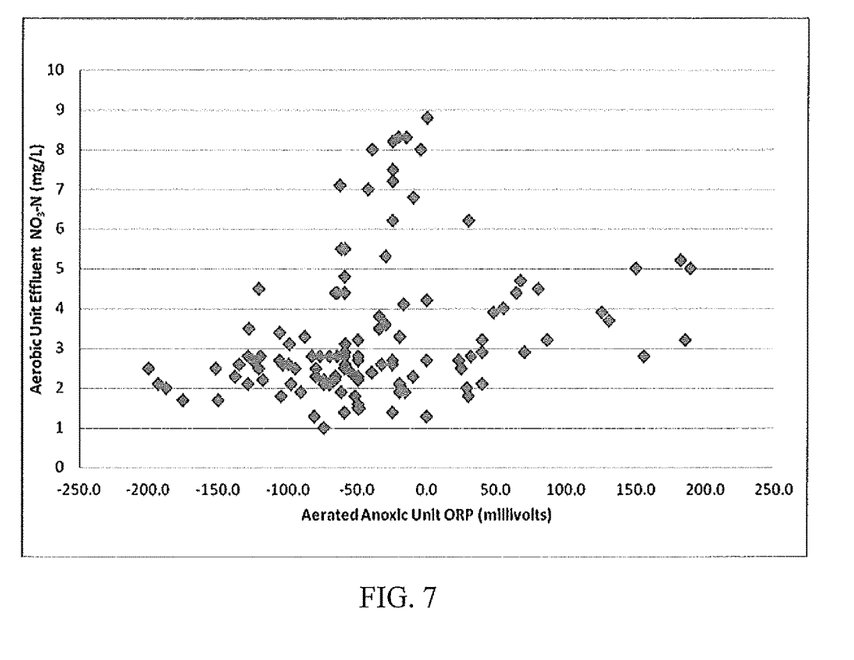
FIG. 7 is a graph of comparing measurements of oxidation reduction potential (ORP) in wastewater in an aerated anoxic treatment unit of a wastewater treatment system to nitrate concentration in effluent of an aerobic treatment unit of the wastewater treatment system.

The measured nitrate concentration in the aerated-anoxic treatment unit (the first biological treatment unit) was compared to the nitrate concentration found in the effluent from the third biological treatment unit (an aerobic treatment unit). This revealed a strong relationship between nitrate concentration in the aerated-anoxic treatment unit and in the effluent of the aerobic treatment unit (See FIG. 6). In this example, keeping nitrates in the aerated-anoxic treatment unit at less than about 0.8 mg/l resulted in good quality effluent having a nitrate concentration of less than about 3 mg/L. Surprisingly, there was no apparent relationship between effluent nitrates and ORP measured in the aerated-anoxic treatment unit, the usual control parameter (see FIG. 7). This example illustrates that by monitoring nitrate/ammonia level in the aerated-anoxic treatment unit and adjusting the aeration of the aerated-anoxic treatment unit to maintain a certain concentration of nitrate/ammonia in the aerated-anoxic treatment unit, an effluent concentration of nitrate/ammonia in effluent from the downstream aerobic treatment unit of sufficient quality can be obtained.

Embodiments of the monitoring/control technique disclosed herein are not limited to any specific type of denitrification process. One skilled in the art can readily appreciate that it is possible to monitor either nitrate/nitrite or ammonia concentrations in the process and use these concentration values to control aeration or other parameters such as supplemental carbon source addition to achieve effluent nitrate/ammonia concentrations that meet regulatory discharge limits.

The methods and systems described herein are not limited in their application to the details of construction and the arrangement of components set forth in the previous description or illustrations in the figures. The methods and systems described herein are capable of other embodiments and of being practiced or of being carried out in various ways. Also, the phraseology and terminology used herein is for the purpose of description and should not be regarded as limiting. The use of "including," "comprising," "having," "containing," "involving," "characterized by," "characterized in that," and variations thereof herein is meant to encompass the items listed thereafter, equivalents thereof, as well as alternate embodiments consisting of the items listed thereafter exclusively.

Use of ordinal terms such as "first," "second," "third," and the like in the specification and claims to modify an element does not by itself connote any priority, precedence, or order of one element over another or the temporal order in which acts of a method are performed, but are used merely as labels to distinguish one element having a certain name from another element having a same name, but for use of the ordinal term, to distinguish the elements.

Those skilled in the art would readily appreciate that the various parameters and configurations described herein are meant to be exemplary and that actual parameters and configurations will depend upon the specific application for which the apparatus and methods of the present disclosure are used. Those skilled in the art will recognize, or be able to ascertain using no more than routine experimentation, many equivalents to the specific embodiments described herein. For example, those skilled in the art may recognize that the system, and components thereof, according to the present disclosure may further comprise a network of systems or be a component of a water treatment system. It is, therefore, to be understood that the foregoing embodiments are presented by way of example only and that, within the scope of the appended claims and equivalents thereto, the disclosed systems and methods may be practiced otherwise than as specifically described. The present systems and methods are directed to each individual feature, system, or method described herein. In addition, any combination of two or more such features, systems, or methods, if such features, systems or methods are not mutually inconsistent, is included within the scope of the present disclosure. The steps of the methods disclose herein may be performed in the order illustrate or in alternate orders and the methods may include additional or alternative acts or may be performed with one or more of the illustrated acts omitted.

Further, it is to be appreciated various alterations, modifications, and improvements will readily occur to those skilled in the art. Such alterations, modifications, and improvements are intended to be part of this disclosure, and are intended to be within the spirit and scope of the disclosure. In other instances, an existing facility may be modified to utilize or incorporate any one or more aspects of the methods and systems described herein. Thus, in some instances, the systems may involve connecting or configuring an existing facility to comprise a treatment system or components of a treatment system, for example, using the methods and systems comprising aeration systems controlled at least in part responsive to nitrogen species concentration measurements in the treatment system as disclosed herein. Accordingly, the foregoing description and figures are by way of example only. Further, the depictions in the figures do not limit the disclosures to the particularly illustrated representations.

While exemplary embodiments of the disclosure have been disclosed, many modifications, additions, and deletions may be made therein without departing from the spirit and scope of the disclosure and its equivalents, as set forth in the following claims.

What is claimed is:

1. A method of treating wastewater, the method comprising:
   introducing the wastewater into an aerated anoxic treatment unit configured to perform bacterial nitrification and bacterial denitrification processes;
   flowing an oxygen containing gas into the wastewater in the aerated anoxic treatment unit at a first flow rate;
   measuring a concentration of nitrate in the wastewater in the aerated anoxic treatment unit;
   comparing the measured concentration of the nitrate to a target nitrate concentration;
   adjusting the flow of the oxygen containing gas into the wastewater in the aerated anoxic treatment unit to a second flow rate in response to a difference between the measured concentration of the nitrate and the target nitrate concentration;
   maintaining the second flow rate for a time period sufficient for the wastewater to be treated in the aerated anoxic treatment unit and form an anoxically treated liquid having a reduced concentration of the nitrate;
   introducing the anoxically treated liquid into an aerobic biological treatment unit;
   providing conditions for the anoxically treated liquid to be treated in the aerobic biological treatment unit to form an effluent;
   measuring a concentration of nitrate in the effluent;
   determining a correlation between the measured concentration of the nitrate in the effluent and the measured concentration of the nitrate in the wastewater in the aerated anoxic treatment unit; and
   setting the target nitrate concentration based on the determined correlation to achieve a concentration of the nitrate in the effluent below an effluent nitrate target concentration.

2. The method of claim 1, wherein adjusting the flow of the oxygen containing gas to the second flow rate comprises decreasing the flow of the oxygen containing gas from the first flow rate to the second flow rate responsive to the concentration of the nitrate in the wastewater in the aerated anoxic treatment unit exceeding the target nitrate concentration.

3. The method of claim 1, further comprising measuring a concentration of ammonia in the wastewater in the aerated anoxic treatment unit.

4. The method of claim 3, wherein adjusting the flow of the oxygen containing gas to the second flow rate comprises increasing the flow of the oxygen containing gas from the first flow rate to the second flow rate responsive to the measured concentration of ammonia.

5. The method of claim 4, further comprising setting a target ammonia concentration to have a value of about five milligrams per liter.

6. The method of claim 1, further comprising measuring a concentration of ammonia in the effluent.

7. The method of claim 6, wherein setting the target nitrate concentration comprises setting the target nitrate concentration to achieve an ammonia concentration in the effluent below about one milligram per liter.

8. A wastewater treatment system comprising:
   an aerated anoxic treatment unit configured to perform bacterial nitrification and bacterial denitrification processes;
   an aerobic biological treatment unit;
   a first nitrogen species concentration sensor included in the aerated anoxic treatment unit and configured to output a signal indicative of a concentration of nitrate in wastewater present in the aerated anoxic treatment unit;
   a second nitrogen species sensor configured to output a signal indicative of a concentration of nitrate in effluent of the aerobic biological treatment unit; and
   a control system configured to:
      introduce wastewater into the aerated anoxic treatment unit;
      flow an oxygen containing aeration gas into the wastewater in the aerated anoxic treatment unit at a first flow rate;
      measure a concentration of nitrate in the wastewater in the aerated anoxic treatment unit using the first nitrogen species concentration sensor;
      compare the measured concentration of the nitrate to a target nitrate concentration;
      adjust a flow of the oxygen containing aeration gas into the wastewater in the aerated biological treatment unit to a second flow rate responsive to a difference between the measured concentration of the nitrate and the target nitrate concentration;
      maintain the second flow rate for a time period sufficient for the wastewater to be treated in the aerated anoxic treatment unit and form an anoxically treated liquid having a reduced concentration of the nitrate;
      introduce the anoxically treated liquid into the aerobic biological treatment unit;
      control conditions of the aerobic biological treatment unit such that the anoxically treated liquid is treated in the aerobic biological treatment unit to form the effluent;
      measure a concentration of nitrate in the effluent using the second nitrogen species concentration sensor;
      determine a correlation between the measured concentration of the nitrate in the effluent and the measured concentration of the nitrate in the wastewater in the aerated anoxic treatment unit; and
      set the target nitrate concentration based on the determined correlation to achieve a concentration of the nitrate in the effluent below an effluent nitrate target concentration.

9. The system of claim 8, further comprising a third nitrogen species concentration sensor configured to output a signal indicative of a concentration of ammonia in the wastewater in the aerated anoxic treatment unit.

10. The system of claim 9, wherein the control system is further configured to increase a flow of the oxygen containing aeration gas responsive to the signal from the third nitrogen species concentration sensor being indicative of a concentration of ammonia in the wastewater in the aerated anoxic treatment unit exceeding a target ammonia concentration.

11. The system of claim 10, wherein the target ammonia concentration has a value of about five milligrams per liter.

12. The system of claim 8, wherein the control system is configured to decrease a flow of the aeration gas responsive to the signal from the first nitrogen species concentration sensor being indicative of the concentration of the nitrate in the wastewater in the aerated biological treatment unit exceeding the target nitrate concentration.

* * * * *